Jan. 16, 1923.
P. H. HAMILTON.
AUTOMATIC CONTROLLER.
FILED SEPT. 12, 1916.
1,442,145.
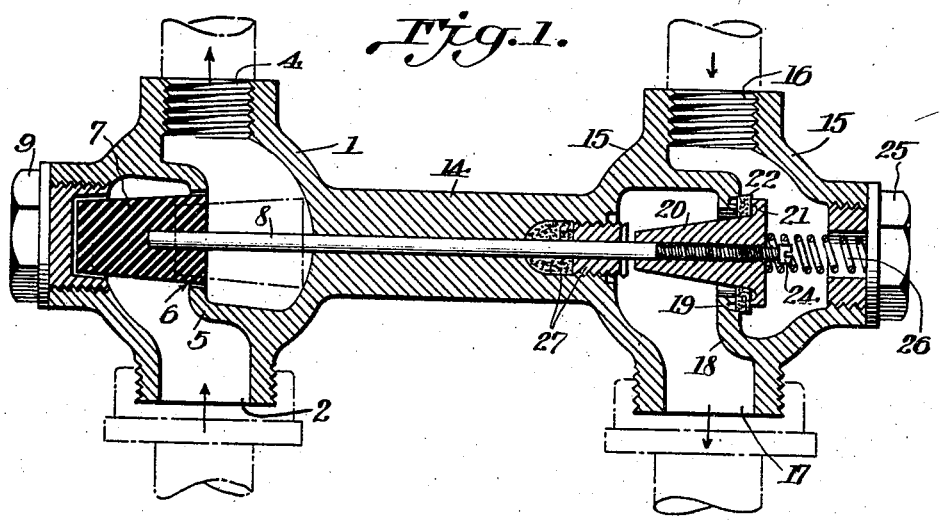
Fig.1.
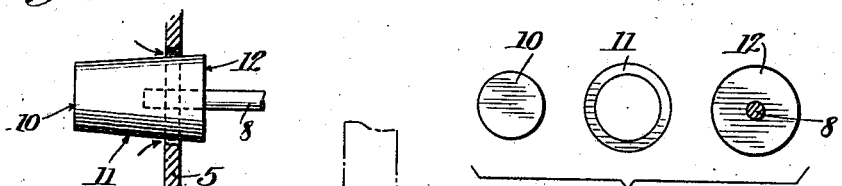
Fig.2.
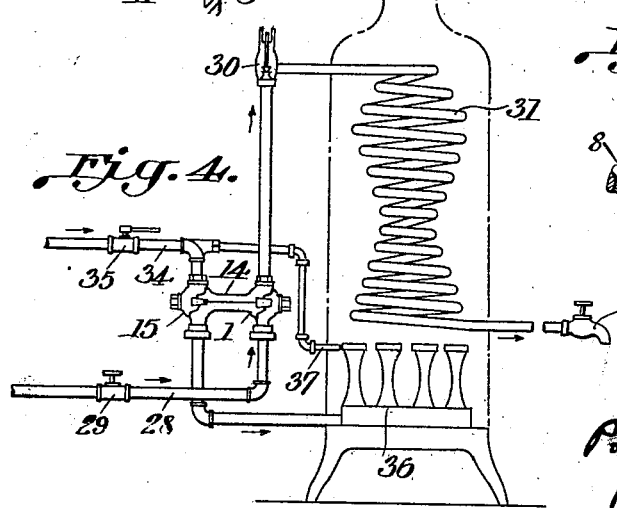
Fig.4.
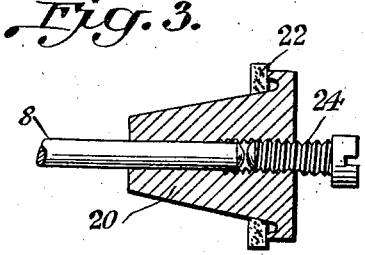
Fig.3.
Fig.5.
Inventor:
Paul H. Hamilton
by Ramsey and Parmelee
Attys.

Patented Jan. 16, 1923.

1,442,145

UNITED STATES PATENT OFFICE.

PAUL H. HAMILTON, OF NEW YORK, N. Y., ASSIGNOR TO ESDA MANUFACTURING COMPANY, OF WILMINGTON, DELAWARE, A CORPORATION OF DELAWARE.

AUTOMATIC CONTROLLER.

Application filed September 12, 1916. Serial No. 119,665.

*To all whom it may concern:*

Be it known that I, PAUL H. HAMILTON, a citizen of the United States, and a resident of the city of New York, county of New York, State of New York, have invented certain new and useful Improvements in Automatic Controllers, of which the following is a specification.

This invention relates broadly to valve control, and more particularly to a control for a gas valve for an automatic water heater.

One of the principal objects of this invention is to provide a control for a gas valve for a water heater whereby the principal element of control is the amount and velocity of water flowing so that the amount of gas passing through the gas valve will be controlled proportionally to the amount of water flowing through the controller.

Another object of the present invention is to provide a water controlled gas valve for water heaters and the like, whereby the controller in the water line is suspended in such manner that the controller element does not contact with the side walls of the controller casing.

A still further and primary object of the present invention is to provide a water controller for a gas valve which is characterized by a structure including an inlet and an outlet with a partition provided with a passageway and extending between said inlet and outlet and with a controller plug extending through or suspended in the said passageway and out of contact with the side walls thereof, with the said controller plug constructed with static pressure areas and flow pressure areas so that the controller plug assumes pre-determined positions of rest relative to said passageway and due to relationship of parts wherein forces acting upon said controller plug are equalized.

A still further and primary object of the present invention is to provide a water controlled gas valve of great rigidity and extreme simplicity of such construction that all moving parts may be removed without disturbing the connections to the water line or gas line.

A further and primary object of the present invention is to provide a controller for a gas valve wherein the controller is formed of non-corrosive elements, such as vulcanite, and wherein the controller is normally out of contact with the side walls of the casing in which it is mounted.

A further object of this invention is to provide a construction wherein the regulation of the gas is controlled without the use of a thermostat and characterized by controls that are determined by the water flow so that the expansion of the heated water in the coils may produce a back pressure which affects the flow through the controller, thereby effecting the control of the gas.

Other and further objects of the present invention will in part be obvious and will in part be pointed out hereinafter in the specification following, by reference to the accompanying drawings in which like parts are represented by like characters throughout the several figures thereof.

Figure 1 is a detail view showing the controller gas valve in section. Figure 2 is a detail view of the controller element showing a portion thereof in section. Figure 3 is a diagrammatic view illustrating the static pressure areas and the flow or dynamic pressure area on the controller plug. Figure 4 is a more or less diagrammatic view showing the controller in its relation to other parts of an automatic gas heater. Figure 5 is a detail view of the loose connection between the connecting rod and the gas valve.

Heretofore in the art of automatic gas heaters, it has been common to provide mechanism whereby the gas valve was opened when the water was turned on at the service tap. The most common construction in the art provides a controller operating entirely by pressure or static forces whereby the gas valve is fully opened when the water is turned on and having a thermostat for regulating the gas flow by the temperature of the water either in or after it leaves the heating coils.

The present invention comprises a control for the gas valve, which control is operated by static and dynamic forces, the dynamic force being established by the water flow past a movable member which extends through a passageway and wherein the construction is such that a movement of the parts changes the effective area through which the water is flowing so that the greater the flow of water the larger the effective area. This control member is connected through suitable connections with a gas valve which is constructed to likewise have its effective area correspondingly varied by opening or closing of the valve so that a greater movement of the valve produces a correspondingly greater area through which the gas may flow.

Referring now to the drawings and more particularly to Figure 1, the control casing 1 is provided with an inlet 2 and an outlet 4, with a partition 5 between the inlet and outlet. The partition 5 as illustrated is provided with a cylindrical opening 6 through which the vulcanite controller plug 7 is suspended with the walls of the controller plug spaced apart from the side walls of the opening 6. The controller plug 7 is loosely mounted upon and suspended by the connecting rod 8, which as will hereinafter be described, co-operates with the gas valve. The control casing is provided with an assembly opening that is in axial alignment with the cylindrical opening 6 and this assembly opening facilitates the removal of the controller plug or the connecting rod without disconnecting the device from the water and gas lines to which the device is connected. The assembly opening preferably is closed by a screw cap 9.

Referring now more particularly to Figures 2 and 3, it will be noted that the inlet end 10 of the controller plug is slightly smaller than the outlet end 12 and that the side wall 11 is tapered. Because of this fact, the area of the inlet end of the plug is less than the area of the outlet end of the plug by the difference which is equivalent to the projection of the area of the side wall 11, as is illustrated in the central view of Figure 3. It will be noted, therefore, that under complete static conditions, namely, where the controller is subjected to pressure without flow, the forces on the controller plug 7 will be in equilibrium, except for the area of the cross sections of the connecting rod 8. Where a valve is opened at the outlet side of the controller and a flow of water starts through the controller casing, the flow will continue through the area between the plug and the walls of the opening 6. This flow establishes a flow or dynamic pressure on the side of the plug which tends to move the plug in the direction of flow and also the static pressure on the inlet end is now slightly in excess of the static pressure on the outlet end so that the plug will move against the connecting rod 8. As the plug moves inward the area between the plug and the side walls of the opening 6 increases and consequently the dynamic pressure diminishes. Under these conditions it will be noted that the controller plug will assume a pre-determined position relatively to the partition 5, wherein the static pressure on the inlet end of the plug plus dynamic pressure on the sides of the plug will be equal to the static pressure on the outlet end 12 of the plug. This position of the controller is a variable dependent upon the amount or rate of flow of water passing through the controller.

In this improved construction the control casing 1 is rigidly connected by means of an integral arm or bar 14 with the gas valve casing 15, and it is through this bar or arm that the connecting rod 8 extends to operatively connect the gas valve mechanism with the controller plug. The gas valve casing is likewise provided with an inlet 16 and an outlet 17. An integral partition 18 extends across the passageway between the inlet and outlet and this partition is provided with a valve seat 19. A conical valve 20 is loosely mounted upon the connecting rod 8 and is provided on its upper end with an overhanging annular lip 21. A washer of leather or other suitable material 22 is provided between the annular lip and the valve seat in order to provide a gas tight closure. An adjusting screw 24 extends through the upper end of the conical gas valve 20 and contacts directly with the end of the connecting rod 8, whereby the effective length of the connecting rod may be properly adjusted. By adjusting this screw 24 the normal position of the control plug 7 in the partition opening 6 is changed and consequently the area between the plug and the walls of the opening is also changed. From the foregoing it will be seen that, since the normal position of the gas valve is fixed by being seated on the valve seat 19, the adjustment changes the area between the plug and the walls of the opening. This change affects the sensitiveness of operation of the control, so that where the said area is small the control opens the gas valve when a slight flow of water is established; and where the area is large a proportionately larger flow of water must be established before the gas valve opens. In order to facilitate assembly and adjustment, the gas valve casing 15 is likewise provided with an assembly opening axially aligned with the gas valve and closed by the screw plug 25. A coiled spring 26 is supported by the screw plug and bears against the gas valve in order to securely seat this valve when the controller plug is in extreme outward position under a condition where no water is flowing through the controller. It will be noted that because of the conical shape of the gas valve a longitudinal opening movement of this valve correspondingly increases the effective gas passageway to proportionally increase the delivery of gas to the burners. A gasket 27 is provided to prevent leakage between the gas and water connection.

Referring now to Figure 4, which shows a general assembly relation, the control casing is connected to the water main line 28 which may be provided with a suitable cut-off valve 29 and which water line after passing through the controller is preferably provided with a key adjusting valve 30. The water line includes the usual heating coils 31 which lead to the service line that is controlled by the usual service valve or spigots 32. The gas valve is connected to the gas main line 34 which likewise may be provided with a suitable cut-off valve 35. After passing the gas valve, the gas line leads to a burner 36. The usual pilot burner is provided as at 37.

In the operation of this device, as has been repeatedly pointed out, the control is largely dependent upon water flow so therefore the expansion of the water when heated in the coils 31 checks, or may even stop, the flow through the controller and when this condition occurs the controller is correspondingly affected so that by this apparatus the gas is regulated both by quantity of water flow and also by temperature of the water without the interposition of any thermostatic mechanism.

Realizing that it is possible to vary the specific physical embodiment of my invention herein shown, I desire that it be understood that the particular structure shown and described is to be considered as illustrative and not to be taken in a limiting sense.

Having thus described my invention what I claim is:—

1. A water controlled gas valve, comprising in combination a controller casing, a controller mounted for movement with reference to said controller casing and out of contact with said controller casing, a gas valve casing, a gas valve within said gas valve casing, an arm integral with and connecting said gas valve casing and said controller casing, said arm being provided with a substantially uniform passageway, a connector extending through said passageway, said controller being loosely mounted upon one end of said connector, said gas valve being loosely mounted upon the other end of said connector, and axially aligned adjusting means for adjusting the relationship between said controller, said connecting rod, and said gas valve.

2. In a device of the class described, in combination a water controller casing, provided with an inlet and an outlet, a partition between said inlet and said outlet, said partition being provided with an opening, a controller plug movable through said opening and at all times out of contact therewith, said controller plug being conical and longer than said opening with the smaller end of the plug extending toward the inlet side, a connecting rod on the outlet side, a gas valve connected to said rod, and an adjustment screw carried by said gas valve and contacting with the end of the said rod to adjust relative position of the plug of the said partition when the gas valve is closed.

3. A flow regulator including a casing having a longitudinally extending guide member and apertured flow partitions associated with the extremities thereof, a controller rod supported on the guide member for longitudinal movement, a flow actuated controller plug of differential effective cross-section extending through the aperture in one of said partitions and supported on the controller rod, a controlling valve of differential throttling effectiveness associated with the other flow partition and slidably supported on said controller rod, yielding pressure means effective normally to maintain said valve in closed position, and an adjustable device for varying the effective relationship of said valve and said rod to determine the operative relationship of the controller plug to its partition.

4. In an automatic water heater the combination of a gas burner, a water conduit adapted to be heated by the gas burner, a water line for leading water under pressure to the conduit, a controller in the water line and surrounded on all sides by water and being sensitive to both dynamic and static pressures, a service valve controlling the outlet from the conduit, connecting means operatively connecting the controller and the gas valve to enable the controller to open the gas valve when the service valve is opened, and a spring tending to seat the gas valve in opposition to the action of the controller.

5. In an automatic water heater the combination of a gas burner, a water conduit adapted to be heated by the gas burner, a water line for leading water under pressure to the conduit, a controller in the water line and surrounded on all sides by water and being sensitive to both dynamic and static pressures, a service valve controlling the outlet from the conduit, connecting means operatively connecting the controller and the gas valve to enable the controller to open the gas valve when the service valve is opened, a spring tending to seat the gas valve in opposition to the action of the controller, whereby the gas valve is closed when the effective pressures on the controller are less than the spring pressure so that the expansion and contraction of water in the conduit due to heating and cooling disturbs the pressures on the controller and thereby automatically operates the gas valve to maintain the service water at temperatures between predetermined limits, and devices to adjust the said connecting means to regulate the predetermined temperature limits.

PAUL H. HAMILTON.